May 4, 1965 R. T. HUKKI Re. 25,774

APPARATUS FOR WET SIZING OF FINELY DIVIDED SOLID MATERIALS

Original Filed June 3, 1959

RISTO TAPANI HUKKI
INVENTOR.

BY Albert M. Parker

ATTORNEY.

United States Patent Office

Re. 25,774
Reissued May 4, 1965

25,774

APPARATUS FOR WET SIZING OF FINELY DIVIDED SOLID MATERIALS

Risto Tapani Hukki, Otakalio, Otaniemi, Finland, assignor to Insinooritoimisto-Engineering Bureau R. T. Hukki, Otakalio, Otaniemi, Finland, a firm of Finland Original No. 3,064,806, dated Nov. 20, 1962, Ser. No. 817,810, June 3, 1959. Application for reissue May 6, 1963, Ser. No. 278,814
Claims priority, application Sweden June 6, 1958
7 Claims. (Cl. 209—17)

Figure 1:
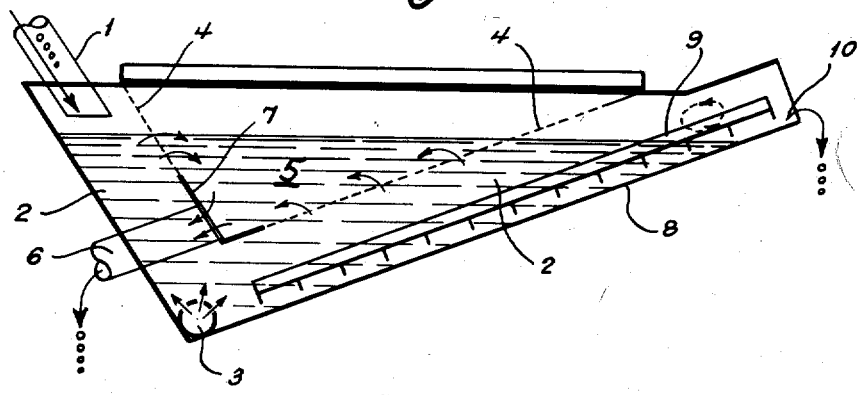

Matter enclosed in heavy brackets [ ] appears in the original patent but forms no part of this reissue specification; matter printed in italics indicates the additions made by reissue.

This invention relates to an improvement in wet sizing of [solids containing] finely divided *solid* particles.

In processing of mineral raw materials, grinding is technically and economically of great importance. The final degree of fineness of the ground product depends on the material treated as well as on the purpose of the process. As special examples it may be mentioned that for a flotation process the ores are usually ground to such a finess that only 1–10% of the final product will be retained on a 65 mesh (208 microns) screen; for cyanidation, many gold ores are ground substantially finer; and for cement, the raw materials are ground to at least 80–90% passing a 200 mesh (74 microns) screen.

In wet grinding the size distribution of the final product is controlled almost exclusively by classification whereby a two-product separation of the solids is obtained. The overflowing suspension forms an end product of that particular classification process while the coarser material such as classifier sands, or cyclone underflow, is usually returned for further size reduction to the grinding unit such as a tumbling mill operating in closed circuit with the classifying unit.

The most severe defects of the classification process is the fact that the coarser product contains a substantial percentage of material sufficiently fine to be included in the finished product. In many cases e.g. the tonnage of such fine material returned to the grinding unit within a certain interval of time equals, even exceeds the respective tonnage of the final material separated. It is therefore natural that a substantial part of the capacity of the grinding unit is wasted on size reduction that is fully useless, in many cases even detrimental.

It is well known that the conventional industrial screening process becomes increasingly more difficult with increasing degree of fineness of the separation. This is especially true with the wet screening process. In all cases where the feed to a screen is introduced in such a way that the weight of the material is borne by the screen, the fine screen surface becomes an object of heavy wear, tear, and blinding. It must be also realized that the retained oversize particles hinder continuously the passage of the finer particles through the screen.

The purpose of this invention is to introduce a sizing method which on one hand includes many of the best features of both the classification and the screening processes, and on the other hand eliminates some of their most apparent weaknesses. In this way a precision separation of the solids into two or more products is obtained which by far exceeds the sharpness that can be achieved by the present conventional methods of industrial sizing in respective cases.

The process of wet sizing [solids containing] finely divided *solid* particles according to this invention makes use of the carrying capacity of a fluid medium flowing at a desired rate and the simultaneous size controlling capacity of a sizing screen surface of desired type and fineness, the fine particles being carried through the screen by the medium flowing in a direction which at least somewhat deviates upward from horizontal, while the oversized fraction is retained at all times during the process below or outside the screen. In this way a fine product characterized by size distribution below a certain maximum controlled by the screen aperture is obtained with a fairly large volume of the medium, while the other product characterized by a coarser size distribution is *discharged* [discharge] from the apparatus used in the practice of this invention with a relatively small volume of the medium. If desired, the medium may be recirculated after the fine solids have been partially or fully separated from the fine size product.

In cases where one sizing screen only is used, a two-product separation is obtained as explained above. Each additional sizing screen of a different fineness will increase the number of products by one. In multiple sizing screen systems the fineness of the screen surface must increase in the direction of flow of the medium. In cases where for example flat sizing screen surfaces are used, the coarsest screen must be placed undermost and the finest screen topmost.

The wet sizing process according to this invention can be applied in a single step or in multiple steps, either alone or in combination with any of the conventional wet sizing methods, for precision separation into two or more products of all [solids containing] finely divided *solid* particles that are or can be separated or processed by wet classification or by wet fine screening according to the conventional methods. In particular, this invention covers sizing of crushed, ground or unground minerals of any kind and of any combination including coal, materials such as glass, slag, finely divided and powdered metals and alloys, ground wood, wooden and synthetic fibers, etc. In addition it may be used for processes such as desliming of sands and other materials, recovery of filler in paper industry, removal of solid substances from water, etc.

Of the many uses of the precision sizing according to this invention, its adaptation as the sole or adjunct process of fine sizing of minerals in closed grinding circuits is expected to become one of its most fertile fields of application. Effective elimination of the size fraction corresponding in fineness to the final material, or to a material having a sufficient degree of liberation, from the large conventional return loads will not only result in an increase in the capacity of the size reducing unit such as a grinding mill operating at subcritical or at supercritical speeds, with metallic or with autogenous medium, but also in a decreased energy consumption in grinding. Additional advantages will include improved overall metallurgy in flotation, in cyanidation, in magnetic separation, in leaching, etc. because of decreased overgrinding of minerals. Improvement in particular many result in higher grade of the concentrate, higher recovery, improved thickening, filtration and drying, decreased reagent consumption, lower treatment time, greater capacity of the processing machinery etc. The validity of the invention is shown by the following experiment:

A sample of classifier sands of an iron ore weighing two kilos was treated in such a way that in a conical vessel water was added through the bed of solids and the pulp was kept in turbulent motion by means of compressed air jets. The fine fraction has to pass through a flat sizing screen surface of about 48 mesh (0.3 mm.). After dewatering and drying, the products gave the following screen analyses:

| Screen | Fine product, percent through | Coarse product, percent through | Calculated head sample, percent through | Recovery of undersize material in the fine product, percent |
|---|---|---|---|---|
| 35 mesh | 99.9 | 53.6 | 77.7 | 66.8 |
| 48 mesh | 99.5 | 32.1 | 67.0 | 77.0 |
| 65 mesh | 86.9 | 20.7 | 54.9 | 82.0 |
| 100 mesh | 67.0 | 14.3 | 41.7 | 83.5 |
| 150 mesh | 50.8 | 8.6 | 30.5 | 86.5 |
| 200 mesh | 37.4 | 5.0 | 21.8 | 89.0 |
| Weight distribution, percent | 51.9 | 48.1 | 100.0 | ---------- |

The hydraulic apparatus which is used in the practice of this invention can be designed in many different ways.

The sizing screen itself may have a flat, irregular, curved, cylindrical or conical surface, or may include horizontal, inclined, or vertical planes, or curved sections, with or without impermeable parts which can act as launders, as spirals, or as other instruments for the removal of the fine product. In multiple screen devices the two or more sizing screen surfaces of different fineness may be essentially superimposed if they are flat or relatively flat, or may be placed within each other if they are cylindrical or conical.

The tank or the vessel of the apparatus and the screening system may be arranged also in such a fashion that they form the counterparts of a resonating system.

Figure 2:
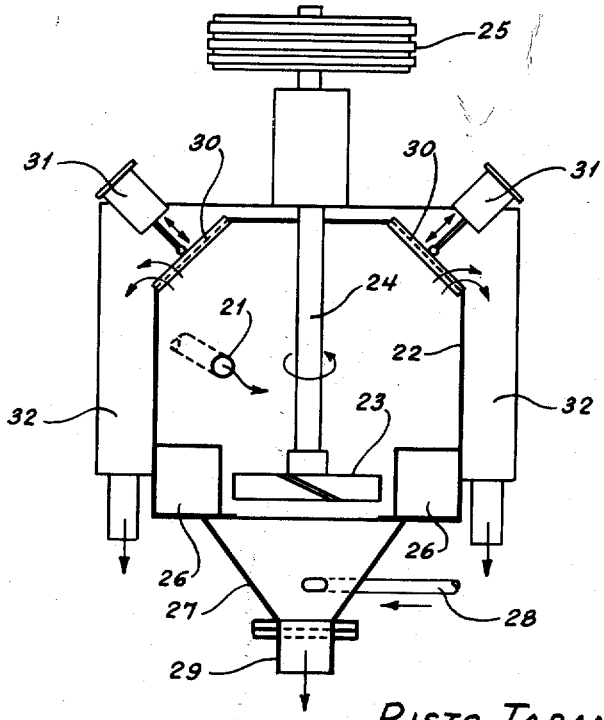

Two different constructions of apparatus for the practice of the method according to this invention are shown in section in FIGS. 1 and 2.

As shown by FIG. 1, the material containing finely divided particles is introduced through feed pipe 1 into vessel 2 where water admitted under pressure through perforated pipe 3 will cause the particles to be pressed against screens 4 having in this case openings of 0.2 mm., whereby particles finer than 0.2 mm. will pass through the screens while larger particles remain suspended in the pulp within vessel 2, or settle to its bottom. The finer fraction which passes screens 4 into space 5 formed by them will be discharged with the liquid through pipe 6. Plates 7 are installed in the lower part of space 5 and around pipe 6 to facilitate the discharge of fine particles. The coarse particles are discharged over lip 10 by means of rake 9 placed into vessel 2 above its sloping bottom 8. Rake 9 moves as indicated by the closed arrow.

As shown by FIG. 2, feed is introduced through pipe 21 into a rectangular box 22 where it is agitated and given the desired upward motion by impeller 23 carried on a vertical shaft 24 and driven by drive 25 from any suitable source of power. Pulp movements are regulated by baffles 26. The coarse particles tend to settle downward into the conical extension 27 where they are washed, if desired, with water introduced under pressure tangentially through pipe 28 the direction of the water flow being the same as the circular flow of solids. Washed sands are discharged through manually or automatically controlled discharge valve 29. The upper part of the pulp body is continuously moving by the action of the impeller 23 *counter to gravity* against two [flat] *inclined* screen surfaces 30 of desired fineness and of desired material. In one sizing unit, the number of screens may vary from one to four. Each screen consists of a detachable rectangular frame to which the screen cloth proper is attached with or without heavier supporting screens, springs, wires, or other reinforcing elements. The screen as a unit, or preferentially its surface only is vibrated by magnetic or mechanical vibrators 31. Normally, a separate vibrator may be provided for each screen. The fine fraction passing the screens is collected in launders 32. Rapid removal of any screen with frame and its replacement by a new unit can be performed without an interruption in the operation e.g. by means of a separate damper-like tool introduced into the box 22 behind screen 30 in such a way as to prevent the flow of pulp through the opening formed during the process of replacement.

What I claim is:

1. An apparatus for the wet sizing of [solids containing] finely divided *solid* particles in a pulp, comprising a stationary vessel, means to impart substantially rotary motion to pulp within said vessel, means for settling down and removing the coarser size fraction of said particles from said pulp, inclined screen means positioned at the upper portion of said vessel, means to direct the upper portion of said pulp in said vessel continuously *counter to gravity* against said screen means and means to vibrate said screen means to accelerate the passage of the finer size fraction of said particles through said screen means together with the bulk of the liquid medium to be collected as a separate product outside said vessel.

2. Apparatus as in claim 1, said substantially rotary motion imparting means comprising an impeller.

3. Apparatus as in claim 1 and including baffles for regulating the substantially rotary motion of said pulp within said vessel.

4. Apparatus for wet sizing of [solids containing] finely divided *solid* particles in a pulp, comprising a stationary vessel and impeller and baffles mounted within said vessel and creating under actuation of said impeller an agitation zone within said vessel, said vessel being provided beneath said agitation zone with an upwardly diverging conical extension for the reception of said coarser size fraction on settlement of the same, means to introduce water tangentially and under pressure into said extension to wash the said coarser size fraction, valve means connected to said extension for the discharge of said coarser size fraction, inclined screen surface means positioned at the upper part of said vessel for engagement with the upper layer of pulp continuously directed *counter to gravity* against the same by water introduced into said vessel, means to vibrate said screen surface means to accelerate the passage of finer size fraction together with the bulk of liquid medium therethrough, and launder means positioned outside of said vessel but in communication with the exit side of said screens for removal of said finer size fraction together with the bulk of the liquid medium as a separate product.

5. An apparatus for the wet sizing of [solids containing] finely divided *solid* particles in a pulp, comprising a stationary vessel, means to impart motion to pulp within said vessel, means for settling down and removing the coarser size fraction of said particles from said pulp, inclined screen means positioned at the upper portion of said vessel, means to direct the upper portion of said pulp in said vessel continuously *counter to gravity* against said screen means and means to vibrate said screen means to accelerate the passage of the finer size fraction of said particles through said screen means together with the bulk of the liquid medium to be collected as a separate product outside said vessel, the lower portion of said vessel being formed with an upwardly diverging conical extension for the settling of said coarser size fraction.

6. An apparatus for the wet sizing of [solids containing] finely divided *solid* particles in a pulp, comprising a stationary vessel, means to impart motion to pulp within said vessel, means for settling down and removing the coarser size fraction of said particles from said pulp, inclined screen means positioned at the upper portion of said vessel, means to direct the upper portion of said pulp in said vessel continuously *counter to gravity* against said screen means and means to vibrate said screen means to accelerate the passage of the finer size fraction of said particles through said screen means together with the bulk of the liquid medium to be collected as a separate product outside said vessel, the lower portion of said vessel being formed with an upwardly diverging conical extension for the settling of said coarser size fraction, and means to introduce water under pressure into said extension to wash said coarser size fraction before the same is discharged from said vessel.

7. An apparatus for the wet sizing of [solids containing] finely divided *solid* particles in a pulp, comprising a stationary vessel, means to impart motion to pulp within said vessel, means for settling down and removing the coarser size fraction of said particles from said pulp, inclined screen means positioned at the upper portion of said vessel, means to direct the upper portion of said pulp in said vessel continuously *counter to gravity* against said screen means and means to vibrate said screen means to accelerate the passage of the finer size fraction of said particles through said screen means together with the bulk of the liquid medium to be collected as a separate product outside said vessel, and launders positioned outside of said vessel but in communication with the interior of the same for the removal of the said finer size fraction toegther with the bulk of said liquid medium for collection as a separate product.

References Cited by the Examiner

The following references, cited by the Examiner, are of record in the patented file of this patent or the original patent.

UNITED STATES PATENTS

| | | | |
|---|---|---|---|
| 2,064,398 | 12/36 | Zeigler | 209—169 |
| 2,540,517 | 2/51 | Glasco | 209—17 |
| 2,570,035 | 10/51 | Laughlin | 209—17 |
| 2,684,154 | 7/54 | Daman | 209—17 |
| 2,880,870 | 4/59 | Colin | 209—17 X |

FOREIGN PATENTS

| | | |
|---|---|---|
| 356,815 | 7/22 | Germany. |
| 363,816 | 11/22 | Germany. |

HARRY B. THORNTON, *Primary Examiner.*

HERBERT L. MARTIN, *Examiner.*